US006618710B1

(12) United States Patent
Zondervan et al.

(10) Patent No.: US 6,618,710 B1
(45) Date of Patent: Sep. 9, 2003

(54) APPARATUS AND METHOD FOR INTELLIGENT ROUTING OF ELECTRONIC MESSAGES TO PAGERS AND COMPUTERS

(75) Inventors: Quinton Yves Zondervan, Boston, MA (US); Stephen J. Foley, Quincy, MA (US); Mark S. Day, Milton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/348,781

(22) Filed: Jul. 7, 1999

(51) Int. Cl.[7] .......................... G06F 17/00; G06F 17/20
(52) U.S. Cl. ......................... 706/11; 709/206; 709/227
(58) Field of Search ..................... 707/10; 709/206, 709/227, 224, 232; 340/506, 7.29; 704/200, 235; 379/142.15, 93.24; 713/201; 706/11

(56) References Cited

U.S. PATENT DOCUMENTS

| | | | |
|---|---|---|---|
| 5,008,926 A | 4/1991 | Misholi et al. | 379/88.13 |
| 5,317,628 A | 5/1994 | Misholi et al. | 379/88.14 |
| 5,487,100 A * | 1/1996 | Kane | 379/57 |
| 5,586,173 A | 12/1996 | Misholi et al. | 379/88.13 |
| 5,668,855 A | 9/1997 | Misholi et al. | 379/88.22 |
| 5,706,211 A | 1/1998 | Beletic et al. | 709/206 |
| 5,727,159 A | 3/1998 | Kikinis | 709/246 |
| 5,961,590 A | 10/1999 | Mendez et al. | 709/206 |
| 6,006,257 A | 12/1999 | Slezak | 725/110 |
| 6,035,104 A | 3/2000 | Zahariev | 709/203 |
| 6,052,735 A | 4/2000 | Ulrich et al. | 709/236 |
| 6,138,146 A | 10/2000 | Moon et al. | 709/206 |
| 6,147,601 A * | 11/2000 | Sandelman et al. | 340/506 |
| 6,211,782 B1 * | 4/2001 | Sandelman et al. | 340/506 |
| 6,219,694 B1 | 4/2001 | Lazaridis et al. | 709/206 |
| 6,233,608 B1 | 5/2001 | Laursen et al. | 709/217 |
| 6,243,676 B1 | 6/2001 | Witteman | 704/243 |
| 6,247,048 B1 | 6/2001 | Greer et al. | 709/219 |
| 6,256,666 B1 | 7/2001 | Singhal | 709/217 |
| 6,260,148 B1 * | 7/2001 | Aggarwal et al. | 713/201 |
| 2001/0005857 A1 | 6/2001 | Lazaridis et al. | 709/219 |
| 2001/0009016 A1 | 7/2001 | Hofmann et al. | 709/219 |

OTHER PUBLICATIONS

IDG Books Worldwide, Inc., Lotus Notes 4.5, Copyrighted 1997, p. 84, lines 11–15.*

* cited by examiner

*Primary Examiner*—John Follansbee
*Assistant Examiner*—Joseph P Hirl
(74) *Attorney, Agent, or Firm*—Brown, Raysman, Millstein, Felder & Steiner LLP

(57) ABSTRACT

Apparatus and method are provided for intelligently routing electronic messages to computers and pagers. Program code executable by a programmable controller is operative to monitor user activity at a computer workstation, for example. If the user appears to be at the workstation based on the detected activity of a computer workstation input device, the electronic message is forwarded to the computer workstation. If, however, no user activity is detected, the electronic message is forwarded to the user's pager.

42 Claims, 3 Drawing Sheets

APPARATUS AND METHOD FOR INTELLIGENT ROUTING OF ELECTRONIC MESSAGES TO PAGERS AND COMPUTERS

BACKGROUND OF THE INVENTION

The present invention disclosed herein relates generally to processing of electronic mail (e-mail). More particularly, the present invention relates to an apparatus and method for intelligently routing e-mail messages to computers and pagers by determining whether the intended recipient appears to be active at the computer.

It appears that modem professionals always want to stay "connected" in today's information-intensive society. Either a one-way or two-way wireless paging device (pager) with a small but fully functional keyboard provides this sense of connectivity. The pager allows people to receive information when one is out of the office, for example, late at night or early in the morning, by sending and receiving plain-text electronic (e-mail) messages.

While the e-mailing between pagers provides the feeling of being always "connected" with the world, there are certain limitations on the operation of pagers for sending messages. Typically, the pager starts to exhaust its memory capacity after about 120–150 messages, which represents at most a few day's worth of incoming e-mail for most users. This limited memory capacity, together with the somewhat difficult user interface, makes e-mailing via pagers not a preferred choice of communication. For these as well as other reasons, most users would prefer to receive e-mail via computers rather than pagers, if given a choice between the two.

Additionally, the conventional e-mail processing system merely forwards e-mail to a pager without determining first whether the intended recipient might be sitting at his workstation and reading e-mail, for example. As a result, the memory capacity of the pager is unnecessarily used.

Perhaps even more compelling issues are the elimination of annoying redundancy of information and the elimination of unnecessary distraction with respect to pagers. Whether the pager is producing an audible tone or vibrating, it necessarily has a mechanism for attracting the wearer's attention. Although useful when away from a computer, such attention-grabbing mechanism is irritating to many people when it is activated while the wearer happens to be sitting at a computer. It is not easy to turn off this attention-grabbing mechanism, and if the wearer did turn it off, he would run the risk of leaving it off when he went away from the computer.

Another problem is as follows. Once the user is away from the computer, he does not want to re-read those messages already displayed on his computer screen. The conventional e-mail operation with pagers is, once again, deficient in this respect.

A need therefore exists for an apparatus and method that address the above concerns and overcome the disadvantages of the conventional e-mail processing systems.

BRIEF SUMMARY OF THE INVENTION

It is an object of the present invention to provide electronic mail processing apparatus.

It is another object of the present invention to provide the electronic mail processing apparatus for intelligent routing of electronic messages.

It is still another object of the present invention to provide the electronic mail processing apparatus for intelligent routing of electronic messages between computers and pagers.

The above and other objects are achieved by an apparatus for routing electronic messages to pagers and computers. The apparatus comprises means for receiving an electronic message transmitted from one pager or computer to another pager or computer. Also included in the apparatus is means for obtaining the intended recipient's status. The status is selected from active or inactive. The active status may indicate that the intended recipient is currently logged onto a network, and inactive status indicates the intended recipient is not currently logged in. The apparatus further comprises means for forwarding the electronic message to the intended recipient's computer if the obtained status is active. If the obtained status is inactive, the electronic message is forwarded to the intended recipient's pager.

In accordance with one aspect of the present invention, the apparatus further comprises means for detecting an activity by the recipient to determine the recipient's status.

BRIEF DESCRIPTION OF THE DRAWINGS

The present invention is illustrated in the figures of the accompanying drawings which are meant to be exemplary and not limiting, in which like reference characters are intended to refer to like or corresponding parts, and in which.

DETAILED DESCRIPTION OF THE PREFERRED EMBODIMENTS

As a general overview, the present invention detects activity at a computer operated by the user. If the user activity is detected, an e-mail message intended for the user is not forwarded to the user's pager. Instead, the message is redirected to the computer as the preferred choice for receiving e-mail.

Figure 1:
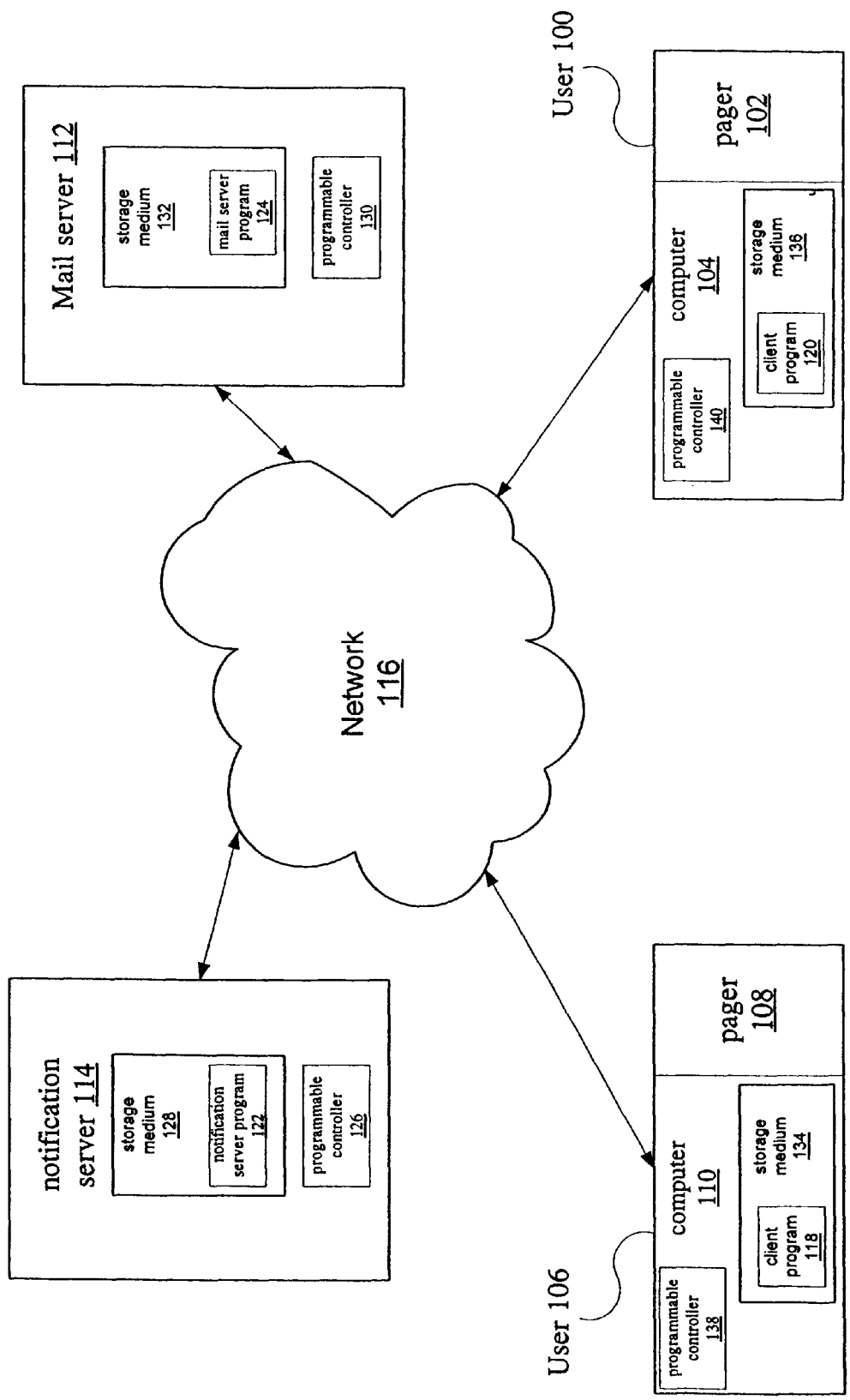
FIG. 1 is a block diagram of the apparatus in accordance with the present invention.

FIG. 1 shows a block diagram of the apparatus in accordance with one embodiment of the present invention. A person may use a computer to log onto the Internet, for example, while wearing a pager. For the purposes of this illustration in block diagram form, a person is identified as user 100 comprising a computer 104 and a pager 102 as shown in FIG. 1. While browsing the Web, the user 100 finds an interesting story and decides to send an e-mail message to his friend, user 106, indicating the address for the Web site that posted this story. Using a conventional e-mail program as known to those skilled in the art, the user 100 enters an e-mail address of the user 106 to send a brief message containing the Web site address. The computer 104 includes a storage medium 136 for storing a client program 120 containing executable code described below, and also includes a programmable controller 140 for executing the program code. The programmable controller 140 carries out the required instructions to connect to the network 116 using, for example, a dial-up modem (not shown) as well known to those skilled in the art.

After establishing the connection, the computer 104 transfers the message to a mail server 112 via the network 116. As known to those skilled in the art, a mail server maintains mailboxes associated with each e-mail user authorized to use the system. The mailboxes are implemented as databases stored in a storage medium 132 as shown in FIG. 1. A mail server program 124 also stored on the storage medium 132 contains scripted commands for processing e-mail and runs continuously on the mail server 112, such as an agent on a Lotus Notes® mail server. The mail server program 124 contains program code executable by a programmable controller 130 located in the mail server 112.

Under control of the programmable controller 130, the mail server program 124 constantly monitors input data for incoming e-mail. After detecting the arrival of e-mail and for each received e-mail message, the mail server program 124 determines whether the message is intended for the user or the mail server program. If the e-mail is intended for the user, the mail server program 124 identifies the intended recipient for that message. A collection of stored rules configurable by the user is applied to determine, for example, whether to send the entire message or a summary of the message containing the sender, subject, and length of the message to the pager. It is understood that the operations of the mail server program 124 are actually performed by the programmable controller 130 executing the program code of the mail server program 124.

The mail server program 124 deposits a copy of the message in the mailbox of the user 100. At some previous point in time, the mail server program 124 established a subscription for the user's status information with notification server 114. The user's status may be active or inactive as described in detail below. When the subscription is established initially, the notification server 114 using notification server program 122 informs the mail server program 124 of the user's current status. At each subsequent point in time, if the user's status stored in the notification server 114 is changed, the notification server 114 immediately notifies the mail server program 124 of the change in the user's status. It is worth noting that such notification is performed without receiving any request from the mail server program 124. It is understood by those skilled in the art that the notification server program 122 contains program code executable by a programmable controller 126 located in the notification server 114.

Returning to the description of FIG. 1, the mail server program 124 checks its local version of the user's status when deciding to route the message. In combination, the notification server 114 and the local updating mechanism at the mail server 112, which receives notifications from the notification server 114, ensure that the local version of user's status substantially accurately reflects the user's status known remotely. This is advantageously performed at low cost in terms of network traffic and time delay.

In one embodiment of the present invention, the program code of the notification server 122 supports Notification Service Transfer Protocol (NSTP) for building synchronous groupware. In synchronous groupware, two or more people collaborate at what they perceive to be "the same time." The coordination between various parts of their state is achieved via a notification service, such as NSTP.

According to NSTP, collaboration-critical state may be shared by several clients. The shared state is stored on a server, where it can be changed by clients. Each change to this shared state causes the server to deliver notifications of the change to other clients. Continuing with FIG. 1, the client programs 118 and 120 may be dubbed as a "colleague awareness" tool for detecting activity on respective computers 110 and 104, whereby the user's status is obtained. The client programs 118 and 120 stored in the respective storage mediums 134 and 136 contain program code executable by the respective programmable controllers 138 and 140. The client programs 118 and 120 are activity detection programs for monitoring an input device, such as a keyboard, mouse, etc., for activity. Similar to conventional screen-saver programs, the activity detection program restarts a timer each time, for example, a key on the keyboard is activated or a mouse is moved. If no key stroke or mouse movement is detected for a predetermined time interval, the activity detection program changes the user's status from active to inactive.

The notification server 114 is informed by the computer 110 of any detected changes in the status of user 106. This notification is performed asynchronously and independently of the transmission of e-mail through the system. Namely, the notification server 114 takes any such change in user's status and distributes it immediately to any and all subscribers to that particular user's status, such as the mail server 112. Hence, there is one system that conveys status information through the network from the computer 110 where it is first detected, through the notification server 114, to the mail server 112. There is a different system that conveys email through the network from sender to receiver. The point of overlap between these two systems is when the mail server program 124 examines its local status information to determine how to route the e-mail message.

Further describing FIG. 1, the mail server program 124 processes the local version of user's status to determine the most suitable message routing. If the user's status is inactive, indicating that the user 106 is most likely away from the computer 110, the mail server program 124 routes the message to a pager 108 belonging to the user 106. Alternatively, if the user's status is active, then the message is routed to the computer 110. As a result, intelligent message routing is achieved with the present invention.

It is understood, of course, that an e-mail message may originate from the pager 102 of the user 100 to the user 106. Alternatively, the user 106 may use the computer 110 or the pager 108 to send an e-mail message to the user 100.

In another embodiment of the present invention, an e-mail address of pager 108 differs from that of the computer account for the user 106. In this case, the programmable controller 130 accesses the storage medium 132 for cross-referencing between the e-mail address of the pager and the e-mail address of the computer account. Consequently, the user 106 may be able to receive the message via the computer 110 or the pager 108.

Figure 2:
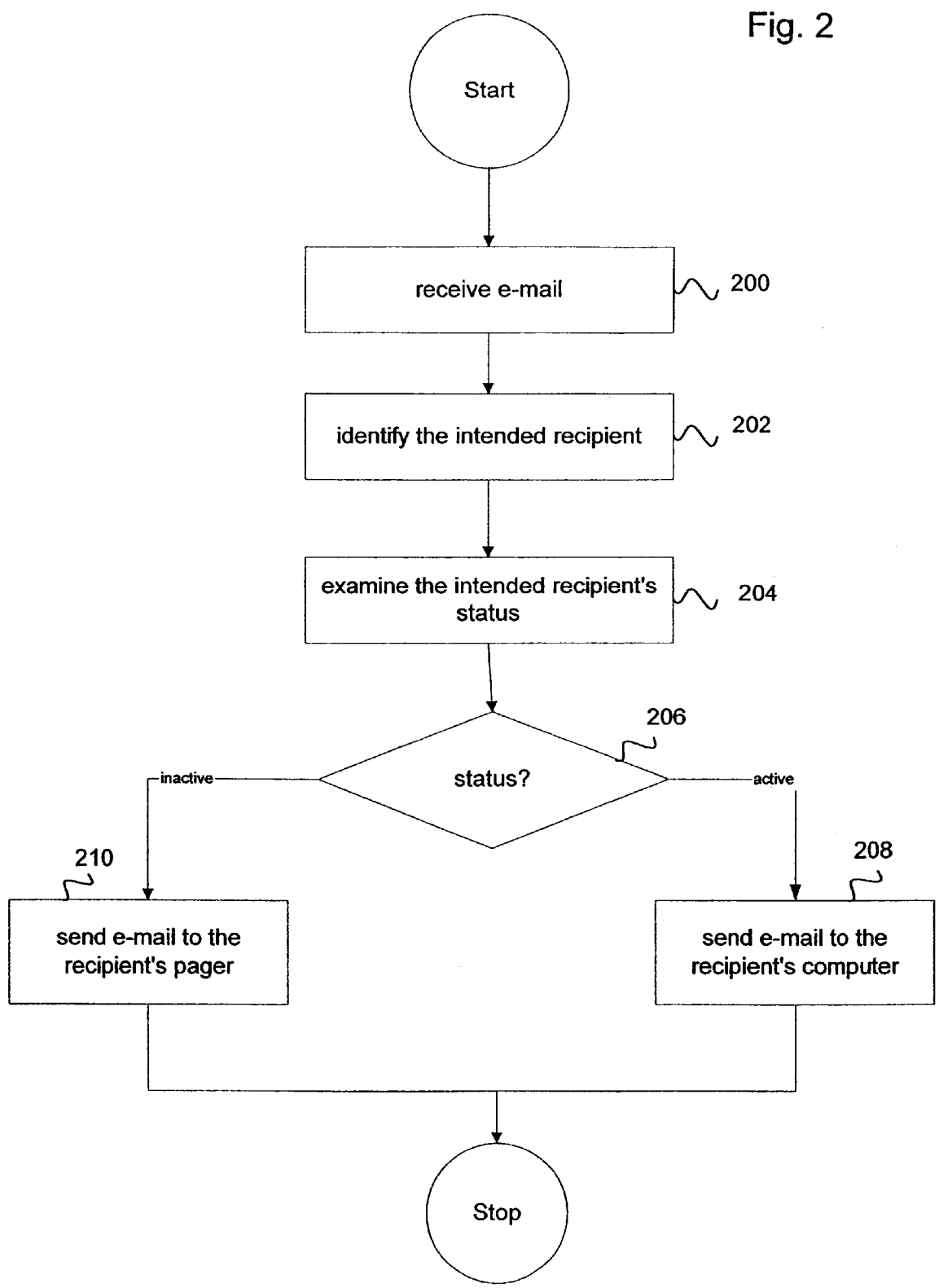
FIG. 2 is a functional flowchart describing the operation of the apparatus of FIG. 1 in accordance with the present invention.

FIG. 2 is a functional flowchart describing the operation of the apparatus of FIG. 1 in accordance with the present invention. In step 200, the message is received by the mail server 112. In step 202, the mail server program 124 identifies the intended recipient of the message. In step 204, the mail server program 124 examines the intended recipient's status (a local version saved at the mail server 112) to determine the most intelligent routing of the message. In step 206, if the obtained status is active, the mail server program 124 routes the message to the recipient's computer 110 in step 208. Otherwise, the message gets forwarded to the recipient's pager 108 in step 210.

Figure 3:
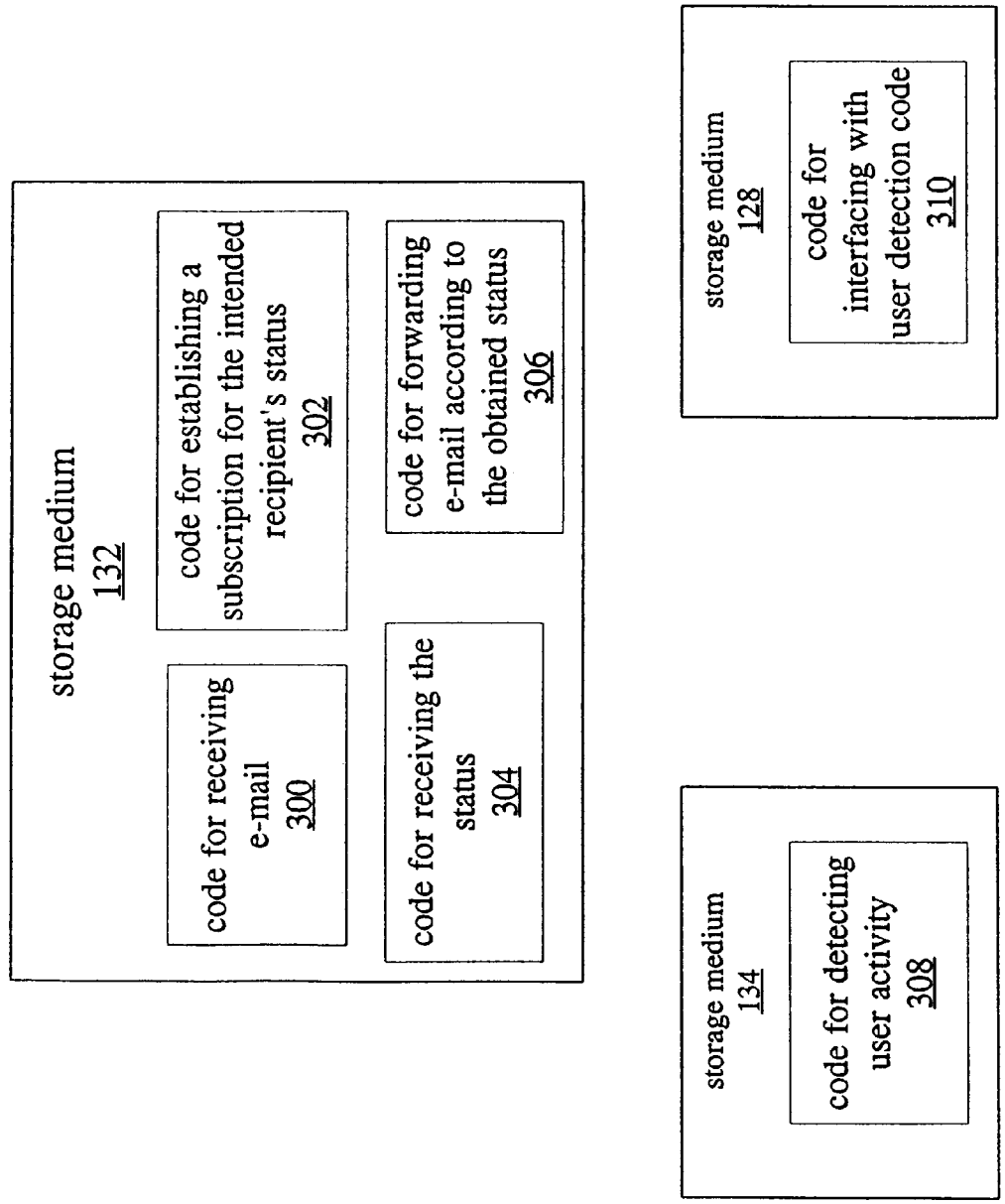
FIG. 3 shows a block diagram of storage mediums for storing program code executable by programmable controllers according to the present invention.

FIG. 3 shows a block diagram of the storage mediums 132, 134 and 128 for storing program code executable by the respective programmable controllers 130, 138 and 126 according to the present invention. The storage medium 132 stores code 300 executed by the programmable controller 130 for receiving the message transmitted from the pager 102 or the computer 104, as shown in FIG. 3. Also, shown in FIG. 3 is code 302 executed by the programmable controller 130 for establishing a subscription for the intended recipient's status. Code 304 stored on the storage medium 132 and executed by the programmable controller 130 receives the status upon change or at predetermined time intervals. Also stored on the storage medium 132 and executed by the programmable controller 130 is code 306 for forwarding the message to the intended recipient's computer or pager according to the status: if the recipient's status is active the message is forwarded to the computer 110, and otherwise the message is forwarded to the pager 108.

FIG. 3 also shows the storage medium 134 storing code 308 for detecting user activity at the computer 110. The code 308 is executed by the programmable controller 138 in the computer 110. Further shown in FIG. 3 is code 310 stored in the storage medium 128 and executed by the programmable controller 126 in the notification server 114. The code 310 is used for interfacing with the code 308 to transfer the intended recipient's status from the user 106 to the mail server 112.

The present invention is advantageous in several aspects over conventional e-mail processing systems. According to the present invention, e-mail is not blindly sent to a pager when, in fact, the user may be working at his computer and is able to read the email more conveniently there. Additionally, the intelligent approach to message routing of the present invention prevents the unnecessary usage of the pager memory capacity because the excessive e-mail is not sent to a pager.

In the preferred embodiment described hereinabove, the activity detection program monitors an input device. However, it is understood that the present invention is not limited thereto, and other activitydetection techniques may be used. Such techniques may include motion detectors, active badges, Global Positioning System (GPS), dead-reckoning via accelerometers, video cameras, heat detectors, pressure-sensitive floors or chairs, microphones, network traffic monitoring, etc., as known to those skilled in the art.

Further, it will be appreciated that computers and pagers may be located on separate and different networks. In this case, code 306 in FIG. 3 is modified accordingly to support the capability of routing e-mail via separate and different networks, based on the user's status.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer system program implemented and enabled in a recordable media for routing an electronic message intended for a user of a computer, the system comprising:
   a mail server program for routing electronic messages to computers; and
   a notification server program connected to the mail server program for obtaining a computer activity status of the user as active or inactive and for communicating the status to the mail server, wherein the mail server program routes the electronic message to the computer if the status is active indicating at least that the computer is in communication with a network and to a pager of the user if the status is inactive.

2. The system of claim 1, comprising the computer detecting the status, and comprising the notification server obtaining the status by the computer transmitting the status to the notification server.

3. The system of claim 1, comprising detecting whether the user is logged onto a network, and wherein the active status indicates that the user is logged onto the network, and the inactive status indicates that the user is not logged onto the network.

4. The system of claim 1, comprising the notification server communicating the status to the mail server upon change of the status.

5. The system of claim 1, comprising the notification server communicating the status to the mail server without receiving a request from the mail server for the notification server to communicate the status to the mail server.

6. The system of claim 1, comprising the notification server communicating the status to the mail server at predetermined time intervals.

7. The system of claim 1, comprising detecting the status by network traffic monitoring.

8. The system of claim 2, comprising the computer detecting the status utilizing an activity detection program.

9. The system of claim 8, comprising detecting the status by monitoring an input device of the computer for activity.

10. The system of claim 9, wherein monitoring an input device comprises detecting whether a key on a keyboard has been activated within a predetermined time interval.

11. The system of claim 10, comprising changing the status from active to inactive if no key has been activated within the predetermined time interval.

12. The system of claim 9, wherein monitoring an input device comprises detecting whether a mouse has been moved within a predetermined time interval.

13. The system of claim 12, comprising changing the status from active to inactive if the mouse has not been moved within the predetermined time interval.

14. The system of claim 2, wherein the computer transmitting the status to the notification server comprises the computer transmitting any changes of the status to the notification server.

15. A method, implemented using one or more computers, for routing an electronic message intended for a user of a computer, the method comprising: a mail server program routing electronic messages to computers; and a notification server program, connected to the mail server program, obtaining a computer activity status of the user as active or inactive and for communicating the status to the mail server, wherein the mail server program routes the electronic message to the computer if the status is active indicating at least that the computer is in communication with a network and to a pager of the user if the status is inactive.

16. The method of claim 15, comprising the computer detecting the status, and comprising the notification server obtaining the status by the computer transmitting the status to the notification server.

17. The method of claim 15, comprising detecting whether the user is logged onto a network, and wherein the active status indicates that the user is logged onto the network, and the inactive status indicates that the user is not logged onto the network.

18. The method of claim 15, comprising the notification server communicating the status to the mail server upon change of the status.

19. The method of claim 15, comprising the notification server communicating the status to the mail server without receiving a request from the mail server for the notification server to communicate the status to the mail server.

20. The method of claim 15, comprising the notification server communicating the status to the mail server at predetermined time intervals.

21. The method of claim 15, comprising detecting the status by network traffic monitoring.

22. The method of claim 16, comprising the computer detecting the status utilizing an activity detection program.

23. The method of claim 22, comprising detecting the status by monitoring an input device of the computer for activity.

24. The method of claim 23, wherein monitoring an input device comprises detecting whether a key on a keyboard has been activated within a predetermined time interval.

25. The method of claim 24, comprising changing the status from active to inactive if no key has been activated within the predetermined time interval.

26. The method of claim 23, wherein monitoring an input device comprises detecting whether a mouse has been moved within a predetermined time interval.

27. The method of claim 26, comprising changing the status from active to inactive if the mouse has not been moved within the predetermined time interval.

28. The method of claim 16, wherein the computer transmitting the status to the notification server comprises the computer transmitting any changes of the status to the notification server.

29. Computer usable media storing program code which, when executed on one or more computerized devices, causes the computerized devices to execute a method for routing an electronic message intended for a user of a computer, the method comprising: a mail server program routing electronic messages to computers; and a notification server program, connected to the mail server program, obtaining a computer activity status of the user as active or inactive and for communicating the status to the mail server, wherein the mail server program routes the electronic message to the computer if the status is active indicating at least that the computer is in communication with the network and to a pager of the user if the status is inactive.

30. The computer usable media of claim 29, wherein the method comprises the computer detecting the status, and the notification server obtaining the status by the computer transmitting the status to the notification server.

31. The computer usable media of claim 29, wherein the method comprises detecting whether the user is logged onto a network, and wherein the active status indicates that the user is logged onto the network, and the inactive status indicates that the user is not logged onto the network.

32. The computer usable media of claim 29, wherein the method comprises the notification server communicating the status to the mail server upon change of the status.

33. The computer usable media of claim 29, wherein the method comprises the notification server communicating the status to the mail server without receiving a request from the mail server for the notification server to communicate the status to the mail server.

34. The computer usable media of claim 29, wherein the method comprises the notification server communicating the status to the mail server at predetermined time intervals.

35. The computer usable media of claim 29, wherein the method comprises detecting the status by network traffic monitoring.

36. The computer usable media of claim 30, wherein the method comprises the computer detecting the status utilizing an activity detection program.

37. The computer usable media of claim 34, wherein the method comprises detecting the status by monitoring an input device of the computer for activity.

38. The computer usable media of claim 37, wherein monitoring an input device comprises detecting whether a key on a keyboard has been activated within a predetermined time interval.

39. The computer usable media of claim 38, wherein the method comprises changing the status from active to inactive if no key has been activated within the predetermined time interval.

40. The computer usable media of claim 37, wherein monitoring an input device comprises detecting whether a mouse has been moved on within a predetermined time interval.

41. The computer usable media of claim 40, wherein the method comprises changing the status from active to inactive if the mouse has not been moved within the predetermined time interval.

42. The computer usable media of claim 30, wherein the computer transmitting the status to the notification server comprises the computer transmitting any changes of the status to the notification server.

* * * * *